United States Patent
Chernysheva et al.

(10) Patent No.: US 9,518,178 B2
(45) Date of Patent: Dec. 13, 2016

(54) MILLING PROCESS

(75) Inventors: Liubov Chernysheva, Caronno Pertusella (IT); Giovanni Comino, Monza (IT); Giulio Brinati, Milan (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 14/239,004

(22) PCT Filed: Aug. 9, 2012

(86) PCT No.: PCT/EP2012/065571
§ 371 (c)(1),
(2), (4) Date: Feb. 14, 2014

(87) PCT Pub. No.: WO2013/023983
PCT Pub. Date: Feb. 21, 2013

(65) Prior Publication Data
US 2014/0213730 A1    Jul. 31, 2014

(30) Foreign Application Priority Data

Aug. 17, 2011 (EP) .................................... 11177803

(51) Int. Cl.
*C08F 214/00* (2006.01)
*C08L 27/20* (2006.01)
*C08F 214/22* (2006.01)
*C08L 27/16* (2006.01)

(52) U.S. Cl.
CPC .............. *C08L 27/20* (2013.01); *C08F 214/22* (2013.01); *C08F 214/222* (2013.01); *C08F 214/225* (2013.01); *C08L 27/16* (2013.01)

(58) Field of Classification Search
CPC ....... C08L 27/16; C08L 27/20; C08L 2205/02; C08F 214/225; C08F 214/222; C08F 214/22
USPC ................................................. 525/199, 200
See application file for complete search history.

(56) References Cited

U.S. PATENT DOCUMENTS

| | | |
|---|---|---|
| 3,752,787 A | 8/1973 | De Brunner |
| 3,876,654 A | 4/1975 | Pattison |
| 4,035,565 A | 7/1977 | Apotheker et al. |
| 4,233,427 A | 11/1980 | Bargain et al. |
| 4,243,770 A | 1/1981 | Tatemoto et al. |
| 4,259,463 A | 3/1981 | Moggi et al. |
| 4,394,489 A | 7/1983 | Aufdermarsh |
| 4,564,662 A | 1/1986 | Albin |
| 4,694,045 A | 9/1987 | Moore |
| 4,720,397 A * | 1/1988 | O'Mara et al. ............... 427/180 |
| 4,745,165 A | 5/1988 | Arcella et al. |
| 4,770,939 A | 9/1988 | Sietses et al. |
| 4,943,622 A | 7/1990 | Naraki et al. |
| 5,030,394 A | 7/1991 | Sietses et al. |
| 5,173,553 A | 12/1992 | Albano et al. |
| 5,177,150 A | 1/1993 | Polek |
| 5,229,460 A | 7/1993 | Yousuf et al. |
| 5,346,727 A | 9/1994 | Simkin |
| 5,447,993 A | 9/1995 | Logothetis |
| 5,767,204 A | 6/1998 | Iwa et al. |
| 5,789,509 A | 8/1998 | Schmiegel |
| 6,037,412 A | 3/2000 | Rijkse et al. |
| 6,340,720 B1 | 1/2002 | Lin et al. |
| 6,596,790 B2 | 7/2003 | Lin et al. |
| 7,868,090 B2 | 1/2011 | Juikar et al. |
| 2009/0107572 A1 | 4/2009 | Hayes et al. |
| 2009/0203846 A1 | 8/2009 | Park et al. |
| 2010/0174011 A1 | 7/2010 | Fox et al. |

FOREIGN PATENT DOCUMENTS

| | | |
|---|---|---|
| EP | 120462 A1 | 10/1984 |
| EP | 136596 A2 | 4/1985 |
| EP | 182299 A2 | 5/1986 |
| EP | 199138 A2 | 10/1986 |
| EP | 335705 A1 | 10/1989 |
| EP | 410351 A1 | 1/1991 |
| EP | 661304 A1 | 7/1995 |
| EP | 684277 A1 | 11/1995 |
| EP | 860436 A1 | 8/1998 |
| EP | 1231239 A1 | 8/2002 |
| WO | 8706597 A1 | 11/1987 |
| WO | 9502634 A1 | 1/1995 |
| WO | 9705122 A1 | 2/1997 |
| WO | 2009065925 A1 | 5/2009 |
| WO | 2010043665 A1 | 4/2010 |
| WO | 2011076652 A1 | 6/2011 |

OTHER PUBLICATIONS

Standard ASTM D3418-08 "Standard test method for transition temperatures and enthalpies of fusion and crystallization of polymers by differential scanning calorimetry", 2008, 7 pages.
Standard ASTM D1895-96, "Standard Test Methods for Apparent Density, Bulk Factor, and Pourability of Plastic Materials", 1996 (Reapproved 2010), 5 pages.

* cited by examiner

Primary Examiner — Nathan M Nutter

(57) ABSTRACT

The invention pertains to a process for cryogenic milling mixtures of (per)fluoroelastomers and semicrystalline thermoplastic VDF polymers, and to free-flowing micronized pellets obtainable therefrom, said micronized pellets advantageously yielding, after extrusion and compounding, excellent mechanical properties, even improved over those of base fluoroelastomer matrix.

20 Claims, No Drawings

US 9,518,178 B2

MILLING PROCESS

CROSS-REFERENCE TO RELATED APPLICATION

This application is a U.S. national stage entry under 35 U.S.C. §371 of International Application No. PCT/EP2012/065571 filed Aug. 9, 2012, which claims priority to European application No. 11177803.1 filed on 17 Aug. 2011. The entire contents of these applications are explicitly incorporated herein by this reference.

TECHNICAL FIELD

Subject matter pertains to a process for cryogenic milling mixtures of (per)fluoroelastomers and semicrystalline thermoplastic VDF polymers, and to free-flowing micronized pellets obtainable therefrom.

BACKGROUND ART

Fluoroelastomers are currently used in a variety of applications in which severe environments are encountered, including high temperatures and aggressive chemicals; fluoroelastomers are the material of choice for certain sealant parts, for compression joints, for fuel lines, etc.

Final parts made from fluoroelastomers are generally manufactured via extrusion moulding and/or compression moulding techniques; increasing automation of these devices often requires the fluoroelastomer material to be available under the form of free-flowing micronized powder, e.g. for being automatically metered through feeding hoppers and the like, e.g. those which extrusion-moulding or injection-moulding apparatuses are equipped with.

Nevertheless, bare fluoroelastomers cannot provide free flowing micronized pellets: in the absence of suitable additives, the material is too sticky; thus, even if grounding can be suitably achieved at low temperature to yield micronized pellets, once said micronized pellets revert to room temperatures, severe packing and sticking phenomena occurs, so that the material looses its free-flowing character and cannot be notably used in metering devices in processing equipments.

Dusting agents, like notably calcium stearate, are routinely used for obtaining a stable free flowing behaviour, even after long storage at room temperature.

Thus, in document US 2010174011 (DUPONT PERFORMANCES ELASTOMERS LLC) Jul. 8, 2010, in particular in sections [0042] to [0047], mention is made of state-of-the-art methodologies for providing fluoroelastomer-based processing aid compositions (basically, combination of fluoroelastomer and interfacial additive); in these sections, mention is made of cryogenic grinding as technology for downsizing fluoroelastomer crumbs or pellets; the addition of a dusting agent to prevent massing is taught as an essential requirement for obtaining a free-flowing compound.

Nevertheless, usual additives could negatively affect the outstanding properties of the fluoroelastomer itself, including mechanical and sealing properties.

SUMMARY OF INVENTION

The Applicant has now surprisingly found that the addition of thermoplastic VDF polymers in the (per)fluoroelastomer composition during cryogenic milling advantageously provides for micronized pellets possessing free-flowing behaviour, maintaining these advantageous flowing properties even after long storage at room temperature, and providing excellent mechanical properties in cured compounds deriving therefrom.

It is thus an object of the present invention a process for manufacturing micronized pellets of a (per)fluoroelastomer composition, said process comprising milling a composition comprising at least one (per)fluoroelastomer [fluoroelastomer (A)] and at least one thermoplastic semicrystalline vinylidene fluoride polymer [polymer (F)] at a temperature below glass transition temperature of said (per)fluoroelastomer.

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Non limitative examples of suitable (per)fluorinated monomers are notably:

$C_2$-$C_8$ fluoro- and/or perfluoroolefins, such as tetrafluoroethylene (TFE), hexafluoropropene (HFP), pentafluoropropylene, and hexafluoroisobutylene;

$C_2$-$C_8$ hydrogenated monofluoroolefins, such as vinyl fluoride; 1,2-difluoroethylene, vinylidene fluoride (VDF) and trifluoroethylene (TrFE);

(per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene (CTFE);

fluoroalkylvinylethers complying with formula $CF_2=CFOR_{f1}$ in which $R_{f1}$ is a $C_1$-$C_6$ fluoro- or perfluoroalkyl, e.g. —$CF_3$, —$C_2F_5$, —$C_3F_7$;

hydrofluoroalkylvinylethers complying with formula $CH_2=CFOR_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

functional fluoro-alkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

fluorodioxoles, of formula:

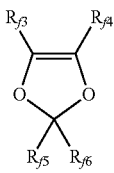

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Examples of hydrogenated monomers are notably hydrogenated alpha-olefins, including ethylene, propylene, 1-butene, diene monomers, styrene monomers, alpha-olefins being typically used.

Fluoroelastomers (A) are in general amorphous products or products having very low degree of crystallinity (heat of fusion of less than 4 J/g, preferably less than 3 J/g, when measured according to ASTM D 3418) and a glass transition temperature ($T_g$) below room temperature. In most cases, the fluoroelastomer (A) has advantageously a $T_g$ below 10° C., preferably below 5° C., more preferably below 0° C.

The fluoroelastomer (A) is preferably selected from the group consisting of:

(1) VDF-based copolymers, in which VDF is copolymerized with at least one comonomer selected from the group consisting of followings classes:

(a) $C_2$-$C_8$ perfluoroolefins, such as tetrafluoroethylene (TFE), hexafluoropropylene (HFP), hexafluoroisobutylene;

(b) hydrogen-containing $C_2$-$C_8$ olefins, such as vinyl fluoride (VF), trifluoroethylene (TrFE), perfluoroalkyl ethylenes of formula $CH_2$=CH—$R_f$, wherein $R_f$ is a $C_1$-$C_6$ perfluoroalkyl group;

(c) $C_2$-$C_8$ chloro and/or bromo and/or iodo-fluoroolefins such as chlorotrifluoroethylene (CTFE);

(d) (per)fluoroalkylvinylethers (PAVE) of formula $CF_2$=$CFOR_f$, wherein $R_f$ is a $C_1$-$C_6$ (per)fluoroalkyl group, e.g. $CF_3$, $C_2F_5$, $C_3F_7$;

(e) (per)fluoro-oxy-alkylvinylethers of formula $CF_2$=CFOX, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

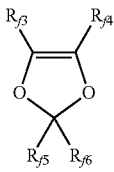

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(g) (per)fluoro-methoxy-vinylethers (MOVE, hereinafter) having formula:

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$=F, H; preferably $X_2$ is F and $R''_f$ is —$CF_2CF_3$ (MOVE1); —$CF_2CF_2OCF_3$ (MOVE2); or —$CF_3$ (MOVE3);

(h) $C_2$-$C_8$ non-fluorinated olefins (Ol), for example ethylene and propylene; and (2) TFE-based copolymers, in which TFE is copolymerized with at least one comonomer chosen from classes (c), (d), (e), (g), (h) as above detailed and the followings:

(i) perfluorovinyl ethers containing cyanide groups.

Among above referred fluoroelastomers (A), VDF-based copolymers are preferred.

Optionally, fluoroelastomer (A) of the present invention also comprises recurring units derived from a bis-olefin [bis-olefin (OF)] having general formula:

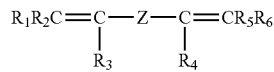

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, preferably at least partially fluorinated, or a (per)fluoropolyoxyalkylene radical, e.g. as described in EP 661304 A (AUSIMONT SPA) Jul. 5, 1995.

The bis-olefin (OF) is preferably selected from the group consisting of those complying with formulae (OF-1), (OF-2) and (OF-3):

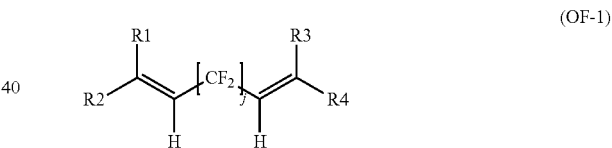

(OF-1)

wherein j is an integer between 2 and 10, preferably between 4 and 8, and R1, R2, R3, R4, equal or different from each other, are H, F or $C_{1-5}$ alkyl or (per)fluoroalkyl group;

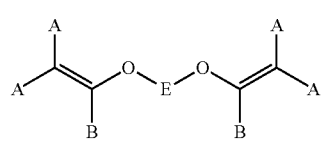

(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C$=CF—O—$(CF_2)_5$—O—CF=$CF_2$.

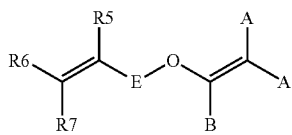

(OF-3)

wherein E, A and B have the same meaning as above defined; R5, R6, R7, equal or different from each other, are H, F or $C_{1-5}$ alkyl or (per)fluoroalkyl group.

Among specific compositions of fluoroelastomers (A) suitable for the purpose of the invention, mention can be made of the following compositions (in mol %):

(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;

(ii) vinylidene fluoride (VDF) 50-80%, perfluoroalkyl vinyl ethers (PAVE) 5-50%, tetrafluoroethylene (TFE) 0-20%, bis-olefin (OF) 0-5%;

(iii) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%, bis-olefin (OF) 0-5%;

(iv) tetrafluoroethylene (TFE) 50-80%, perfluoroalkyl vinyl ethers (PAVE) 20-50%, bis-olefin (OF) 0-5%;

(v) tetrafluoroethylene (TFE) 45-65%, $C_2$-$C_8$ non-fluorinated olefins (Ol) 20-55%, vinylidene fluoride 0-30%, bis-olefin (OF) 0-5%;

(vi) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30%, bis-olefin (OF) 0-5%;

(vii) tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%;

(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%, bis-olefin (OF) 0-5%;

(ix) tetrafluoroethylene (TFE) 20-70%, fluorovinyl ethers (MOVE) 30-80%, perfluoroalkyl vinyl ethers (PAVE) 0-50%, bis-olefin (OF) 0-5%.

According to certain embodiments, fluoroelastomer (A) comprises iodine and/or bromine cure sites. Iodine cure sites are those selected for maximizing curing rate. Fluoroelastomers (A) according to these embodiments are advantageously suitable for peroxide-curing or any mixed curing technique involving peroxide agents.

For ensuring acceptable reactivity it is generally understood that the content of iodine and/or bromine in the fluoroelastomer (A) should be of advantageously at least 0.05% wt, preferably of at least 0.1% weight, more preferably of at least 0.15% weight, with respect to the total weight of fluoroelastomer (A).

On the other side, amounts of iodine and/or bromine not exceeding 2% wt, more specifically not exceeding 1% wt, or even not exceeding 0.5% wt, with respect to the total weight of fluoroelastomer (A), are those generally selected for avoiding side reactions and/or detrimental effects on thermal stability.

All these cure sites might be comprised as pending groups bound to the backbone of the fluoroelastomer (A) polymer chain or might be comprised as terminal groups of said polymer chain.

According to a first embodiment, the iodine and/or bromine cure sites are comprised as pending groups bound to the backbone of the fluoroelastomer (A) polymer chain; the fluoroelastomer (A) according to this embodiment typically comprises recurring units derived from brominated and/or iodinated cure-site comonomers selected from:

bromo and/or iodo alpha-olefins containing from 2 to 10 carbon atoms such as bromotrifluoroethylene or bromotetrafluorobutene described, for example, in U.S. Pat. No. 4,035,565 (DU PONT) Aug. 12, 1977 or other compounds bromo and/or iodo alpha-olefins disclosed in U.S. Pat. No. 4,694,045 (DU PONT) Sep. 15, 1987;

iodo and/or bromo fluoroalkyl vinyl ethers (as notably described in patents U.S. Pat. No. 4,745,165 (AUSIMONT SPA) May 17, 1988, U.S. Pat. No. 4,564,662 (MINNESOTA MINING & MFG [US]) Jan. 14, 1986 and EP 199138 A (DAIKIN IND LTD) Oct. 29, 1986).

The fluoroelastomer according to this embodiment generally comprises recurring units derived from brominated and/or iodinated cure-site monomers in amounts of 0.05 to 5 mol per 100 mol of all other recurring units of the fluoroelastomer, so as to advantageously ensure above mentioned iodine and/or bromine weight content.

According to a second preferred embodiment, the iodine and/or bromine cure sites are comprised as terminal groups of the fluoroelastomer (A) polymer chain; the fluoroelastomer (A) according to this embodiment is generally obtained by addition to the polymerization medium during fluoroelastomer manufacture of anyone of:

iodinated and/or brominated chain-transfer agent(s). Suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \le x+y \le 2$ (see, for example, patents U.S. Pat. No. 4,243,770 (DAIKIN IND LTD) Jan. 6, 1981 and U.S. Pat. No. 4,943,622 (NIPPON MEKTRON KK) Jul. 24, 1990); and alkali metal or alkaline-earth metal iodides and/or bromides, as described notably in patent U.S. Pat. No. 5,173,553 (AUSIMONT SRL) Dec. 22, 1992.

The fluoroelastomer (A) can be prepared by any known method, such as emulsion or micro-emulsion polymerization, suspension or micro-suspension polymerization, bulk polymerization and solution polymerization.

It is essential for the thermoplastic polymer to be semicrystalline, i.e. for it to have an at least partially crystalline structure. In other words, the semicrystalline thermoplastic VDF polymer generally has a heat of fusion, measured according to ASTM standard D 3418, of at least 5 J/g, preferably of at least 15 J/g and more preferably of at least 25 J/g.

The semicrystalline thermoplastic VDF polymer used in the present invention is advantageously chosen from VDF homopolymers and copolymers of VDF with one or more comonomers containing at least one unsaturation of ethylenic type. The amount of VDF in said copolymers is preferably greater than 85 mol % and more preferably greater than 90 mol %, based on the total amount of recurring units.

The comonomers containing at least one unsaturation of ethylenic type are preferably fluorinated. These fluorinated comonomers are preferably selected from the group consisting of classes (a), (b), (c), (d), (e), (f) and (g), as above described in combination with the fluoroelastomer (A).

It is generally preferred for the polymer (F) to be used in the composition to be free from iodine and/or bromine atoms in the end position and/or in the chain of the macromolecules. Avoiding presence of these sites, co-vulcanization with the fluoroelastomer (A) can be significantly reduced, so that sealing properties and elastic behaviour of the vulcanized sealing articles obtainable thereof are preserved.

Polymers (F) that are particularly preferred to the aim of the present invention are VDF homopolymers and VDF copolymers consisting essentially of repeating units derived from VDF and between 0.1 mol % and 15 mol % of repeating units derived from a comonomer chosen from hexafluoropropylene (HFP), chlorotrifluoroethylene (CTFE) and trifluoroethylene (TrFE), and mixtures thereof.

The amount of polymer (F) in the composition is preferably between 5% and 80%, more preferably between 10% and 70% and even more preferably between 15% and 60% by weight relative to the total weight of the fluoroelastomer (A) and of the polymer (F).

The composition submitted to milling in the process of the invention might advantageously comprise other ingredients, including notably curing and crosslinking agents, e.g. those used for ionic or peroxide curing, or usual ingredients, including fillers, pigments, processing aids, and the like.

Nevertheless, all those ingredients can also be added in further steps to the micronized pellets obtained from milling a composition consisting essentially of fluoroelastomer (A) and polymer (F).

The process of the invention can be advantageously carried out in any milling device designed to break a solid material into smaller pieces. Among milling devices which are suitable in the process of the invention, mention can be made of ball mill, conical mill, disk mill, hammer mill, rod mill, and vibratory mill.

Generally, milling devices equipped with a shaft and rotating blades are preferred.

As said, in the process of the invention, milling is carried out at a temperature below glass transition temperature of the fluoroelastomer (A); these conditions are required for advantageously ensuring fluoroelastomer (A) to have a brittle behaviour and thus advantageously undergoing downsizing without massing or sticking.

Generally, milling is carried out at a temperature of at least 5° C., preferably at least 10° C., more preferably at least 20° C. below glass transition temperature of the fluoroelastomer (A).

Lower boundaries for milling temperatures are not particularly critical and will be chosen by the skilled in the art taking into account availability and economy of cooling deviced. It is generally understood that milling temperatures of about −20 to −50° C. would be suitable for most of embodiments of the present inventions and would be easily achievable by means of traditional cooling fluids and devices, with no particular difficulties.

The micronized pellets of the composition comprising fluoroelastomer (A) and polymer (F), as above detailed, are another object of the present invention.

For the purpose of the invention, the term "micronized pellets" is intended to denote a mass of material that, from a geometrical point of view, has a definite three-dimensional volume and shape, characterized by three dimensions, wherein, generally, none of said dimensions exceed the remaining two other dimensions of more than 10 times.

These micronized pellets advantageously possess a free-flowing behaviour at room temperature, that is to say that each pellets is loosely provided, with substantially no sticking or massing phenomena.

The micronized pellets of the present invention have a pourability of less than 60 s, preferably of less than 45 s, more preferably of less than 35 s, when measured according to ASTM D1895 standard, using the funnel of Test method B and the cylinder of Test Method A, when measured at room temperature.

While average size of the micronized pellets is not particularly limited, provided they can be advantageously used in automated feeding devices of processing machineries, it is understood that the micronized pellets of the invention advantageously possess an average diameter of less than 5 mm, preferably of less than 3 mm.

The invention also pertains to the use of the micronized pellets as above described for fabricating shaped articles.

The micronized pellets can then be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, micronized pellets into a finished article made of non-tacky, strong, insoluble, chemically and thermally resistant cured fluoroelastomer-based composition.

The micronized pellets of the invention are advantageously cured by peroxide curing technique, by ionic technique, by tin-catalyzed curing or by a mixed peroxidic/ionic technique.

The peroxide curing is typically performed according to known techniques via addition of suitable peroxide that is capable of generating radicals by thermal decomposition. Organic peroxides are generally employed.

Still an object of the invention is thus a peroxide curable composition comprising micronized pellets as above detailed and at least one peroxide, typically an organic peroxide.

Among most commonly used peroxides, mention can be made of dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate. Other suitable peroxide systems are those described, notably, in patent applications EP 136596 A (MONTEDISON SPA) Apr. 10, 1985 and EP 410351 A (AUSIMONT SRL) Jan. 30, 1991, whose content is hereby incorporated by reference.

Other ingredients generally comprised in the peroxide curable composition, as above detailed, are:

(a) curing coagents, in amounts generally of between 0.5% and 10% and preferably between 1% and 7% by weight relative to the polymer; among these agents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins (OF), as above detailed; triazines substituted with ethylenically unsaturated groups, such as notably those described in EP 860436 A (AUSIMONT SPA) Aug. 26, 1998 and WO 97/05122 (DU PONT [US]) Feb. 13, 1997; among above mentioned curing coagents, TAIC and bis-olefins (OF), as above detailed, and more specifically those of formula (OF-1), as above detailed, have been found to provide particularly good results;

(b) optionally, a metallic compound, in amounts of between 1% and 15% and preferably between 2% and 10% by weight relative to the weight of the polymer, chosen from oxides or hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;

(c) optionally, acid acceptors of the metal non-oxide type, such as 1,8-bis(dimethylamino)naphthalene, octadecylamine, etc., as notably described in EP 708797 A (DU PONT) May 1, 1996;

(d) optionally, other conventional additives, such as fillers, thickeners, pigments, antioxidants, stabilizers, processing aids, and the like.

Ionic curing can be achieved by mixing to the micronized pellets, before, during or after cryogenic milling, one or more curing agent and one or more accelerator suitable for ionic curing, as well known in the art.

Still an object of the invention is thus an ionically curable composition comprising micronized pellets as above detailed and at least one curing agent and at least one accelerator.

The amounts of accelerator(s) are generally comprised between 0.05 and 5 phr and that of the curing agent typically between 0.5 and 15 phr and preferably between 1 and 6 phr, based on fluoroelastomer (A).

Aromatic or aliphatic polyhydroxylated compounds, or derivatives thereof, may be used as curing agents; examples thereof are described, notably, in EP 335705 A (MINNESOTA MINING & MFG [US]+) Oct. 4, 1989 and U.S. Pat. No. 4,233,427 (RHONE POULENC IND) Nov. 11, 1980. Among these, mention will be made in particular of dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts (see, e.g., EP 335705 A (MINNESOTA MINING & MFG [US]+) Oct. 4, 1989 and U.S. Pat. No. 3,876,654 (DU PONT) Apr. 8, 1975); aminophosphonium salts (see, e.g., U.S. Pat. No. 4,259,463 (MONTEDISON SPA) Mar. 31, 1981); phosphoranes (see, e.g., U.S. Pat. No. 3,752,787 (DU PONT) Aug. 14, 1973); imine compounds of formula $[Ar_3P-N=PAr_3]^{+n}X^{n-}$, with Ar being an aryl group, n=1 or 2 and X being a n-valent anion as described in EP 0120462 A (MONTEDISON SPA) Oct. 3, 1984 or of formula $[(R_3P)_2N]^+X^-$, with R being an aryl or an alkyl group, and X being a monovalent anion, e.g. as described in EP 0182299 A (ASAHI CHEMICAL IND) May 28, 1986. Quaternary phosphonium salts and aminophosphonium salts are preferred.

Instead of using the accelerator and the curing agent separately, it is also possible to use an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethyl-phosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position. A method suitable for the preparation of an adduct as above described is described in European patent application EP 0684277 A (AUSIMONT SPA [IT]) Nov. 29, 1995, which is included herein in its entirety by reference.

Other ingredients generally added to the ionically curable composition comprising the micronized pellets of the invention, when curing via ionic route are:

i) one or more mineral acid acceptors chosen from those known in the ionic curing of vinylidene fluoride copolymers, typically comprised in amounts of 1-40 parts per 100 parts of fluoroelastomer (A);

ii) one or more basic compounds chosen from those known in the ionic curing of vinylidene fluoride copolymers, typically added in amounts of from 0.5 to 10 parts per 100 parts of fluoroelastomer (A).

The basic compounds mentioned in point ii) are commonly chosen from the group constituted by $Ca(OH)_2$, $Sr(OH)_2$, $Ba(OH)_2$, metal salts of weak acids, for instance Ca, Sr, Ba, Na and K carbonates, benzoates, oxalates and phosphites and mixtures of the abovementioned hydroxides with the above mentioned metal salts; among the compounds of the type i), mention may be made of MgO.

The above mentioned amounts of the mixture are relative to 100 phr of fluoroelastomer (A). Also, other conventional additives, such as fillers, thickeners, pigments, antioxidants, stabilizers and the like, may then be added to the curing mixture.

Mixed peroxidic/ionic curing can be achieved by simultaneously introducing in the curable composition one or more peroxide, as above detailed, and one or more curing agent and one or more accelerator suitable for ionic curing, as well known in the art.

When the fluoroelastomer (A) comprises recurring units derived from ethylenically unsaturated compounds comprising cyanide groups, organotin compounds or diaromatic amine compounds, as notably described in U.S. Pat. No. 4,394,489 (DU PONT) Jul. 19, 1983 (disclosing allyl-, propargyl- and allenyl-tin curatives), U.S. Pat. No. 5,767, 204 (NIPPON MEKTRON KK) Jun. 16, 1998 (providing bis(aminophenyl) compounds represented by formula:

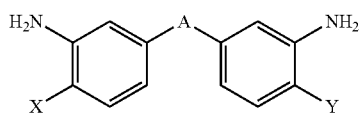

wherein A is an alkylidene group having 1 to 6 carbon atoms or a perfluoroalkylidene group having 1 to 10 carbon atoms and X and Y are a hydroxyl group or an amino group) and U.S. Pat. No. 5,789,509 (DU PONT) Aug. 4, 1998 (disclosing tetraalkyltin, tetraaryltin compounds, bis(aminophenols) and bis(aminothiophenols)). This type of vulcanization may be combined with a vulcanization of peroxide type, in the case where the fluoroelastomer matrix contains iodinated and/or brominated end groups, as described notably in U.S. Pat. No. 5,447,993 (DU PONT) Sep. 5, 1995.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

EXAMPLES

Raw Materials

SOLEF® PVDF 6008 is a VDF homopolymer commercially available from Solvay Solexis S.p.A., having a MFI (230° C./5 kg) of 24 g/10 min, a heat of fusion of 62 J/g and a mp of 174° C., available under the form of powder (PVDF-1, herein after)

TECNOFLON® P 959 fluoroelastomer is a peroxide curable TFE-HFP-VDF terpolymer, having a Mooney Viscosity ML (1+10') at 121° C. of 48 and having a fluorine content of 70% (FKM-1, herein after), available under the form of slabs and having a $T_g$ of about −11° C.

Calcium stearate (CaSt, herein after) was used as received.

Preparative Example 1

Manufacture of a VDF/TFE/HFP Terpolymer Having a Mooney Viscosity of 110 MU (1+10@121° C.) (FKM-2, Herein After)

In a 10 l autoclave, equipped with stirrer working at 545 rpm, were introduced, after evacuation 6.0 l of demineralized water and 45.0 ml of a perfluoropolyoxyalkylene microemulsion obtained by mixing:
- 9.78 ml of an acid terminated perfluoropolyoxyalkylene of formula: $CF_3O(CF_2CF(CF_3)O)_n(CF_2O)_mCF_2COOH$, wherein n/m=10, and having an average molecular weight of 600;
- 3.44 ml of 30% by volume $NH_4OH$ aqueous solution;
- 25.92 ml demineralized water;
- 5.86 ml of GALDEN® D02 PFPE of formula: $CF_3O(CF_2CF(CF_3)O)_n(CF_2O)_mCF_3$, wherein n/m=20, and having an average molecular weight of 450. The autoclave was then heated to 80° C. and maintained at such temperature for the entire duration of the reaction. A mixture of monomers having following composition: vinylidene fluoride (VDF) 17% by moles; hexafluoropropene (HFP) 70% by moles; tetrafluoroethylene (TFE) 13% by moles, was added so as to bring the pressure to 26 bar. 0.51 g of ammonium persulphate (APS) were then introduced for initiating polymerization; the addition was carried out in 2 parts, 0.35 g at the beginning of polymerization and 0.16 g at 20% increment in the monomer conversion. 18.06 g of 1,4-diiodoperfluorobutane ($C_4F_8I_2$) were added as chain transfer agent; the addition was carried out in 3 parts, 2.71 g at the beginning of polymerization, 8.13 g at 20% increment in the monomer conversion and 7.22 g at 80% increment in the monomer conversion. Further, 12.13 g of bis-olefin having the formula: $CH_2=CH-(CF_2)_6-CH=CH_2$, were added in 20 equal parts, at the beginning and every 5% increment in the monomer conversion. Set point pressure was maintained constant during polymerization by feeding a mixture of VDF (48% by moles), HFP (27% by moles), TFE (25% by moles).

After 125 min the autoclave was cooled, and a latex having a solids content of 416.1 g/l was obtained. A terpolymer having a Mooney viscosity, ML (1+10') at 121° C. (ASTM D 1646), equal to 110, and a $T_g$ of about −11° C. was obtained, having a iodine content of 0.23% by weight, and following composition: VDF: 49.5, HFP: 24.6, TFE: 25.9, in % moles.

General Procedure for the Manufacture of Micronized Pellets

Slabs of fluoroelastomer were immersed in liquid nitrogen to cool the same below their glass transition temperature; the cooled slabs were then introduced in the mill maintained at low temperature, generally at a temperature in the range −20° C./−50° C., possibly in combination with the powder of VDF polymer and/or with calcium stearate, in required amount. Compositional ranges of mixtures milled in the different experiments are detailed in following tables:

TABLE 1

| material | Ex. 2 | Ex. 3C | Ex. 4 | Ex. 5C | Ex. 6 | Ex. 7 |
|---|---|---|---|---|---|---|
| FKM-1 | 50% wt | 100% wt | — | — | — | — |
| FKM-2 | — | — | 50% wt | 100% wt | 80% wt | 87% wt |
| PVDF-1 | 50% wt | — | 50% wt | — | 20% wt | 13% wt |

TABLE 2

| material | Ex. 8C | Ex. 9C | Ex. 10C |
|---|---|---|---|
| FKM-2 | 50% wt | 87% wt | 98% wt |
| CaSt | 50% wt | 13% wt | 2% wt |

So obtained micronized materials were found to be under the form of pellets having dimensions of few millimeters.

After at least 24 hours of storage at room temperature, micronized pellets were then submitted to bulk density and pourability measurements pursuant to ASTM D1895 standard. Results are summarized in the following table.

TABLE 3

| | Ex. 2 | Ex. 3C | Ex. 4 | Ex. 5C | Ex. 6 | Ex. 7 |
|---|---|---|---|---|---|---|
| Bulk density[a] (g/l) | 610 | 590 | 580 | 640 | 610 | 620 |
| Pourability[b] (s) | 12 | Not slide | 19 | Not slide | 17 | 31 |

TABLE 4

| | Ex. 8C | Ex. 9C | Ex. 10C |
|---|---|---|---|
| Bulk density[a] (g/l) | 620 | 728 | 735 |
| Pourability[b] (s) | 1 | 4 | Not slide |

(a) measured according to ASTM D 1895, using cylinder of test method A; (b) measured according to ASTM D 1895, but using funnel of Test method B and cylinder of Test method A.

Data summarized above show that a thermoplastic semi-crystalline vinylidene fluoride polymer like PVDF is effective as additive in fluoroelastomers for yielding micronized powders having suitable sliding properties, with pourability behaviour not dissimilar from that obtained in using traditional dusting agents like CaSt.

Sealing and Mechanical Properties Determination on Cured Samples

In this section, comparison of mechanical properties found in cured parts obtained from micronized pellets according to the invention or micronized pellets including CaSt is provided.

All micronized pellets were extruded at speed of 15 rpm in a conical Brabender twin extruder through a 10 mm extruder head, at a temperature of 180° C.

Prior to extrusion, micronized pellets of Ex. 4 and of Ex. 8C were admixed and diluted with FKM-2 for ensuring in both cases final load of filler (PVDF or CaSt) being 20 phr.

Extruded micronized powders as above detailed have been compounded with the additives and all ingredients in the table using an open roll mill. O-rings (size class=214) have been cured in a pressed mould and then post-treated in an air circulating oven in conditions (time, temperature) specified in the Table below.

Plaques were cured in a pressed mould at 160° C. for 17 minutes and then post-treated in an air circulating oven for 4 hours at 230° C.

The tensile properties have been determined on specimens punched out from the plaques, according to the DIN 53504 S2 Standard at room temperature (23° C.) and at high temperature (150° C.).

M100 is the tensile strength in MPa at an elongation of 100%;

TS is the tensile strength in MPa;

EB is the elongation at break in %.

The Shore A hardness (3") (HDS) has been determined on 3 pieces of plaque piled according to the ASTM D 2240 method at room temperature (23° C.).

Compression set values have been determined on 6 mm buttons, according to the ASTM D 395, method B, assembling 3 disks punched out from piled plaques.

TABLE 5

| Run | | Ex. 11 | Ex. 12 | Ex. 13C | Ex. 14C |
|---|---|---|---|---|---|
| Micronized pellets & optional elastomer ingredients | | | | | |
| Powder Ex. 4 | phr | 40 | — | — | — |
| FKM-2 | phr | 80 | — | 80 | — |
| Powder Ex. 7 | phr | — | 115 | — | — |
| Powder Ex. 8 | phr | — | — | 40 | — |
| Powder Ex. 9 | phr | — | — | — | 115 |
| Ratio FKM/filler | | | | | |
| FKM (total) | phr | 100 | 100 | 100 | 100 |
| PVDF (total) | phr | 20 | 15 | — | — |
| CaSt (total) | phr | — | — | 20 | 15 |
| Other ingredients | | | | | |
| Crosslinking agent(*) | phr | 4 | 4 | 4 | 4 |
| C-Black(**) | phr | 30 | 30 | 30 | 30 |
| Peroxide(***) | phr | 1 | 1 | 1 | 1 |
| Mechanical Properties at room temperature (23° C.) | | | | | |
| Tensile Strength | MPa | 34 | 30.5 | 12.9 | 14.4 |
| 100% Modulus | MPa | 16.2 | 16.7 | 7.1 | 7.2 |
| Elongation @ Break | % | 211 | 185 | 240 | 263 |
| Hardness (Shore A) | pts | 90 | 86 | 92 | 89 |
| Mechanical Properties at high temperature (150° C.) | | | | | |
| Tensile Strength | MPa | 12.1 | 9.6 | 4.8 | 4.9 |
| 100% Modulus | MPa | 6.9 | — | — | — |
| Elongation @ Break | % | 148 | 104 | 105 | 98 |
| Sealing properties | | | | | |
| Compression set (70 hours at 200° C.) | | | | | |
| C-set | % | 25.6 | 19.3 | 32.4 | 31.6 |

(*)Crosslinking agent: DRIMIX ® TAIC triallylisocyanurate;
(**)C-black: carbon black N550 FEF;
(***)Catalyst agent: LUPEROX ® 101, neat 2,5-dimethyl-2,5-di(t-butylperoxy)hexane ($C_{16}H_{34}O_4$).

When comparing Ex. 11 to Ex. 13C and/or Ex. 12 to Ex. 14C, the detrimental effect on mechanical properties (in particular lower TS and M100) and on sealing behaviour (higher values of C-set) due to the presence of CaSt is immediately evident. On the other side, when using a thermoplastic semicrystalline vinylidene fluoride polymer, such as PVDF, for manufacturing the micronized powder, mechanical properties are excellent and even improved over those of base fluoroelastomer matrix.

The invention claimed is:

1. A process for manufacturing micronized pellets of a (per)fluoroelastomer composition, said process comprising milling a composition consisting essentially of at least one (per)fluoroelastomer (A) and at least one thermoplastic semicrystalline vinylidene fluoride polymer (F) at a temperature below glass transition temperature of said (per)fluoroelastomer, wherein the micronized pellets, after 24 hours of storage at room temperature, have a pourability of less than 60 s when measured according to ASTM D1895 standard, using the funnel of Test method B and the cylinder of Test Method A, when measured at room temperature.

2. The process of claim 1, wherein fluoroelastomer (A) is selected from the group consisting of:
(1) VDF-based copolymers, in which VDF is copolymerized with at least one comonomer selected from the group consisting of:
(a) $C_2$-$C_8$ perfluoroolefins;
(b) hydrogen-containing $C_2$-$C_8$ olefins;
(c) $C_2$-$C_8$ chloro and/or bromo and/or iodo-fluoroolefins;
(d) (per)fluoroalkylvinylethers (PAVE) of formula $CF_2$=$CFOR_f$, wherein $R_f$ is a $C_1$-$C_6$ (per)fluoroalkyl group;
(e) (per)fluoro-oxy-alkylvinylethers of formula $CF_2$=$CFOX$, wherein X is a $C_1$-$C_{12}$ ((per)fluoro)-oxyalkyl comprising catenary oxygen atoms;
(f) (per)fluorodioxoles having formula:

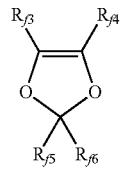

wherein $R_{f3}$, $R_{f4}$, $R_{f5}$, $R_{f6}$, equal or different from each other, are independently selected from fluorine atoms and $C_1$-$C_6$ (per)fluoroalkyl groups, optionally comprising one or more than one oxygen atom;
(g) (per)fluoro-methoxy-vinylethers (MOVE) having formula:

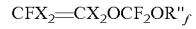

$CFX_2$=$CX_2OCF_2OR''_f$ wherein $R''_f$ is selected from $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$ is selected from F and H; and
(h) $C_2$-$C_8$ non-fluorinated olefins (Ol); and
(2) TFE-based copolymers, in which TFE is copolymerized with at least one comonomer chosen from (c), (d), (e), (g), (h) as above detailed and (i) perfluorovinyl ethers containing cyanide groups.

3. The process of claim 2, wherein fluoroelastomer (A) is selected from the group consisting of VDF-based copolymers, as defined in claim 2.

4. The process of claim 1, wherein fluoroelastomer (A) comprises recurring units derived from a bis-olefin (OF) having general formula:

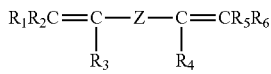

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, or a (per)fluoropolyoxyalkylene radical.

5. The process of claim 4, wherein said bis-olefin (OF) is selected from the group consisting of olefins complying with formulae (OF-1), (OF-2) and (OF-3):

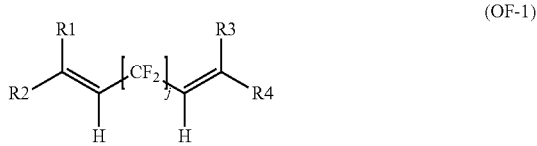
(OF-1)

wherein j is an integer between 2 and 10, and R1, R2, R3, R4, equal or different from each other, are H, F or $C_{1-5}$ alkyl or (per)fluoroalkyl;

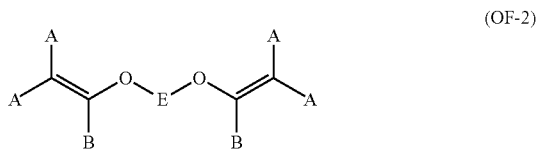
(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atoms, optionally fluorinated, which may be inserted with ether linkages; and

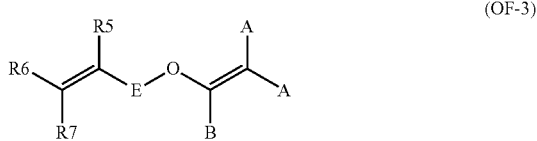
(OF-3)

wherein E, A and B have the same meaning as above defined; and R5, R6, R7, equal or different from each other, are H, F or $C_{1-5}$ alkyl or (per)fluoroalkyl.

6. The process according to claim 1, wherein fluoroelastomer (A) comprises iodine and/or bromine cure sites in such amount that the content of iodine and/or bromine in fluoroelastomer (A) is at least 0.05% wt, and not exceeding 2% wt, with respect to the total weight of fluoroelastomer (A).

7. The process according to claim 6, wherein said cure sites comprise pendant groups bound to the backbone of the fluoroelastomer (A) polymer chain or terminal groups of said polymer chain.

8. The process according to claim 1, wherein polymer (F) has a heat of fusion, measured according to ASTM standard D 3418, of at least 5 J/g.

9. The process according to claim 1, wherein polymer (F) is chosen from VDF homopolymers and copolymers of VDF with one or more comonomers containing at least one unsaturation of ethylenic type, wherein the amount of VDF in said copolymers is greater than 85 mol %, based on the total amount of recurring units.

10. The process according to claim 9, wherein polymer (F) is selected from the group consisting of VDF homopolymers and VDF copolymers consisting essentially of repeating units derived from VDF and between 0.1 mol % and 15 mol % of repeating units derived from a comonomer chosen from hexafluoropropylene (HFP), chlorotrifluoroethylene (CTFE) and trifluoroethylene (TrFE), and mixtures thereof.

11. The process according to claim 1, wherein the amount of polymer (F) in the composition is between 5% and 80% by weight relative to the total weight of fluoroelastomer (A) and polymer (F).

12. Micronized pellets of a composition comprising at least one (per)fluoroelastomer (A) and at least one thermoplastic semicrystalline vinylidene fluoride polymer (F), as prepared by the process according to claim 1, having a pourability of less than 60 s when measured according to ASTM D1895 standard, using the funnel of Test method B and the cylinder of Test Method A, when measured at room temperature.

13. A peroxide curable composition comprising the micronized pellets of claim 12 and at least one peroxide.

14. An ionically curable composition comprising micronized pellets of claim 12 and at least one curing agent and at least one accelerator.

15. The process of claim 2, wherein fluoroelastomer (A) is selected from the group consisting of:
(1) VDF-based copolymers, in which VDF is copolymerized with at least one comonomer selected from the group consisting of:
(a) $C_2$-$C_8$ perfluoroolefins selected from tetrafluoroethylene (TFE), hexafluoropropylene (HFP) and hexafluoroisobutylene;
(b) hydrogen-containing $C_2$-$C_8$ olefins selected from vinyl fluoride (VF), trifluoroethylene (TrFE), and perfluoroalkyl ethylenes of formula $CH_2=CH-R_f$, wherein $R_f$ is a $C_1$-$C_6$ perfluoroalkyl group;
(c) chlorotrifluoroethylene (CTFE);
(d) (per)fluoroalkylvinylethers (PAVE) of formula $CF_2=CFOR_f$, wherein $R_f$ is selected from $CF_3$, $C_2F_5$ and $C_3F_7$;
(e) (per)fluoro-oxy-alkylvinylethers of formula $CF_2=CFOX$, wherein X is perfluoro-2-propoxypropyl;
(per)fluorodioxoles having formula:

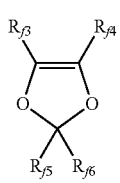

wherein $R_{f3}$, $R_{f4}$, $R_{f5}$, $R_{f6}$, equal or different from each other, are independently selected from fluorine, —$CF_3$, —$C_2F_5$, —$C_3F_7$, —$OCF_3$ and —$OCF_2CF_2OCF_3$;

(g) (per)fluoro-methoxy-vinylethers (MOVE) having formula:

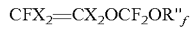

wherein $X_2$ is F and $R''_f$ is selected from —$CF_2CF_3$ (MOVE1), —$CF_2CF_2OCF_3$ (MOVE2) and —$CF_3$ (MOVE5); and (h) $C_2$-$C_8$ non-fluorinated olefins (Ol) selected from ethylene and propylene; and (2) TFE-based copolymers, in which TFE is copolymerized with at least one comonomer chosen from (c), (d), (e), (g), (h) as above detailed and (i) perfluorovinyl ethers containing cyanide groups.

16. The process according to claim 6, wherein fluoroelastomer (A) comprises iodine and/or bromine cure sites in such amount that the content of iodine and/or bromine in fluoroelastomer (A) is at least 0.15% wt, and not exceeding 0.5% wt, with respect to the total weight of fluoroelastomer (A).

17. The process according to claim 8, wherein polymer (F) has a heat of fusion, measured according to ASTM standard D 3418, of at least 25 J/g.

18. The process according to claim 9, wherein polymer (F) is chosen from VDF homopolymers and copolymers of VDF with one or more comonomers containing at least one unsaturation of ethylenic type, wherein the amount of VDF in said copolymers is greater than 90 mol %, based on the total amount of recurring units.

19. The process according to claim 11, wherein the amount of polymer (F) in the composition is between 15% and 60% by weight relative to the total weight of fluoroelastomer (A) and polymer (F).

20. The micronized pellets of claim 12, having a pourability of less than 35 s, when measured according to ASTM D1895 standard, using the funnel of Test method B and the cylinder of Test Method A, when measured at room temperature.

* * * * *